(12) United States Patent
Davis

(10) Patent No.: US 7,472,166 B1
(45) Date of Patent: Dec. 30, 2008

(54) ASSISTING USERS WITH WEB PAGES

(75) Inventor: John M. Davis, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 939 days.

(21) Appl. No.: 09/652,432

(22) Filed: Aug. 31, 2000

(51) Int. Cl.
*G06F 15/16* (2006.01)

(52) U.S. Cl. ................................. 709/217; 709/219

(58) Field of Classification Search ............ 709/204, 709/206, 217, 203, 219, 208, 229; 718/101; 361/683; 713/182; 715/500, 740, 753
See application file for complete search history.

(56) References Cited

U.S. PATENT DOCUMENTS

| | | | | |
|---|---|---|---|---|
| 5,909,545 A * | 6/1999 | Frese et al. | ................. | 709/208 |
| 6,144,991 A * | 11/2000 | England | ..................... | 709/205 |
| 6,177,932 B1 * | 1/2001 | Galdes et al. | ............... | 715/733 |
| 6,230,287 B1 * | 5/2001 | Pinard et al. | .................. | 714/31 |
| 6,256,620 B1 * | 7/2001 | Jawahar et al. | ................. | 707/2 |
| 6,289,333 B1 * | 9/2001 | Jawahar et al. | ................. | 707/2 |
| 6,298,356 B1 * | 10/2001 | Jawahar et al. | ............. | 707/201 |
| 6,377,944 B1 * | 4/2002 | Busey et al. | .................... | 707/3 |
| 6,389,132 B1 * | 5/2002 | Price | ..................... | 379/265.01 |
| 6,449,646 B1 * | 9/2002 | Sikora et al. | ................ | 709/226 |
| 6,519,628 B1 * | 2/2003 | Locascio | .................... | 709/204 |

* cited by examiner

*Primary Examiner*—Frantz B Jean
(74) *Attorney, Agent, or Firm*—Trop, Pruner & Hu, P.C.

(57) ABSTRACT

A system enables a service provider to provide real time, on-line help to a web page user. When the web page user initiates a help request, a client agent may automatically provide a service provider with information, about the particular web page that is causing the problem, sufficient to enable the service provider to access the web page. The agent also initiates a chat session between the service provider and the client. In this way, the service provider can see the actual web page that is causing the problem and may communicate through the chat session channel with the user. In one embodiment, a chat session dialog box may overlie the associated web page.

15 Claims, 6 Drawing Sheets

ASSISTING USERS WITH WEB PAGES

BACKGROUND

This invention relates generally to providing help service to web site users.

Users may require help in connection with various web sites or web pages. Generally, when the user needs help, the user either operates a help button and receives, in effect, pre-prepared information or the user contacts the web site provider through a telephone or e-mail link. In many cases, the web site provider has a large number of web pages and may be uncertain exactly which web page the user has concerns about. In many cases, the web site provider must provide assistance to the web page user without viewing the web page or completely understanding the precise nature of the user's problem.

The quality of the service provided and the amount of time needed to help the user may suffer because the web site provider may not have a clear understanding of the exact issue raised by the user. In some cases, the web site provider can attempt to work through the web pages starting from the home page to attempt to recreate the situation plaguing the user. However, in some cases the user may not remember exactly how the user arrived at a given page. In other cases, it may take an extended amount of time for the web site provider to arrive at the same location in the web site currently creating the problem for the user.

Thus, there is a need for better ways for help service providers to communicate with users requesting help with web pages.

DETAILED DESCRIPTION

Figure 1:
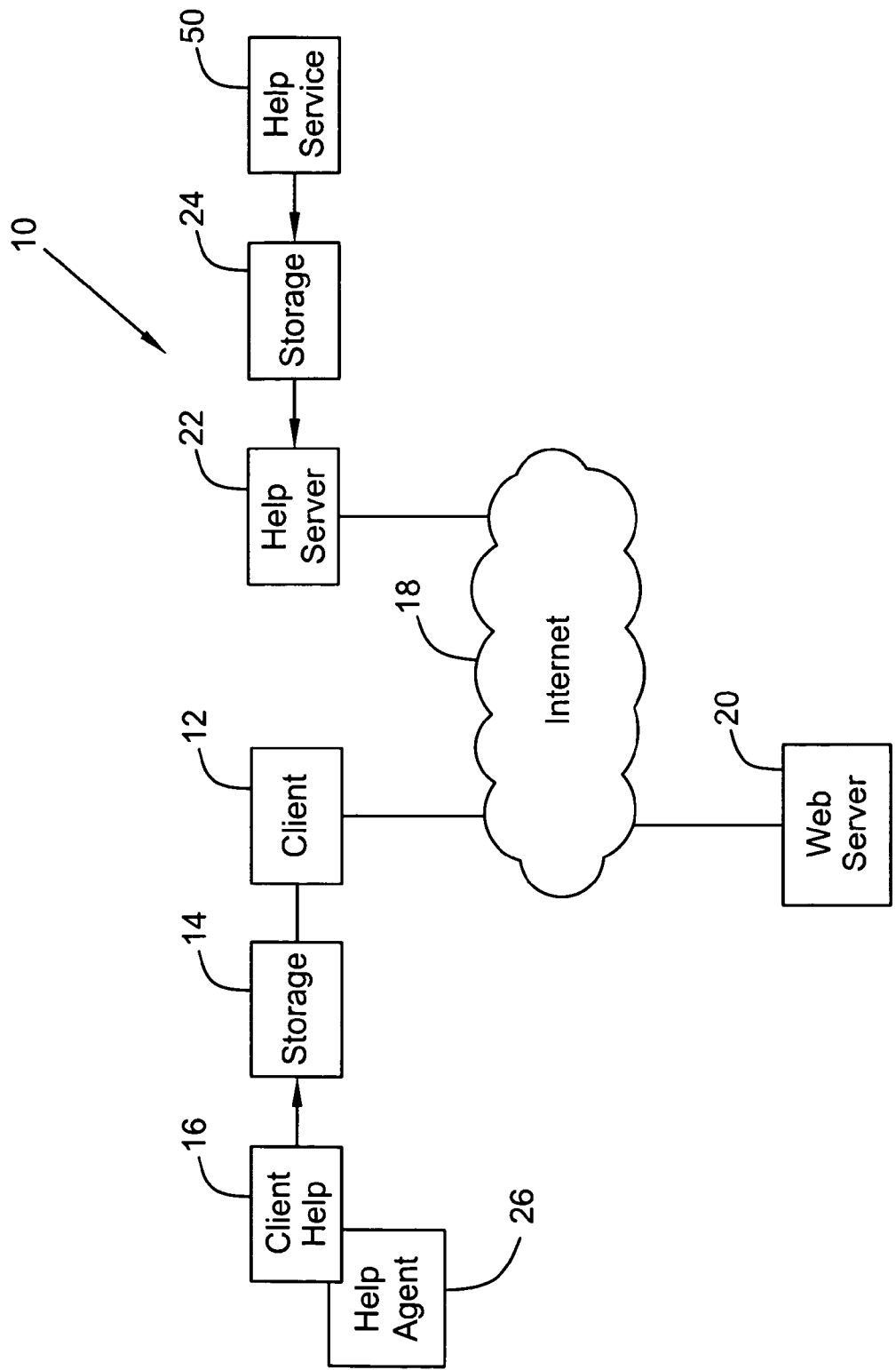
FIG. 1 is a schematic depiction of one embodiment of the present invention.

A system 10, shown in FIG. 1, includes a client 12, a web server 20 and a help server 22, all of which communicate over the Internet 18 in one embodiment of the invention. In some cases, the web server 20 and the help server 22 may be combined into a single site. The web server 20 provides a web page for viewing on a client 12 and the help server 22 assists the user of the client 12 with problems the user may have in understanding or using a given web page.

The client 12 may be a processor-based system such as a desktop computer, a laptop computer, a handheld computer, an Internet appliance, or a set-top box, as examples. The connection between the client 12 and the Internet 18 may be a wired or a wireless connection. The client 12 may be coupled to a storage 14, such as a hard disk drive, that stores software including the client help software 16 and the help agent 26.

The web server 20 may be a conventional Hyptertext Transfer Protocol web site provider that provides a plurality of web pages for viewing using the client 12. Some of these pages may include a variety of features which may give rise to user problems. For example, the web server 20 may provide web pages that reference executables that may raise compatibility problems. Similarly, the web pages may require a user to fill out a form, for example to purchase a product. The completion of such forms may also give rise to problems.

The help server 22 may be a processor-based system such as a Hypertext Transfer Protocol server that communicates with the client 12 using the Secure Hypertext Transfer Protocol (HTTPS) in one embodiment of the invention. Thus, the communications between the help server 22 and the client 12 may be secure from general viewing. The help server 22 may be coupled to a storage 24 that stores software such as the help service routine 50.

Figure 2:
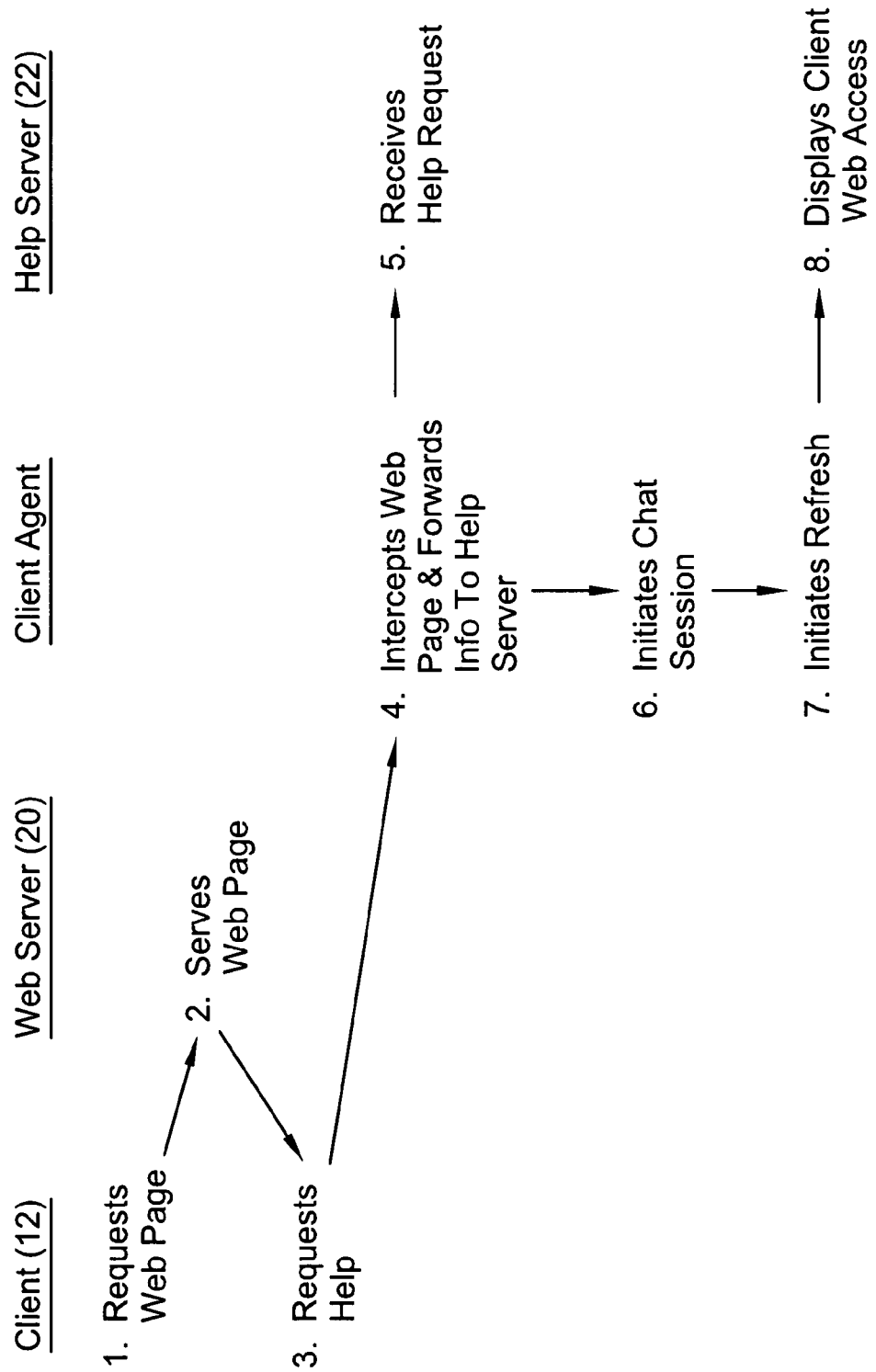
FIG. 2 is a chart showing a process in accordance with one embodiment of the present invention.

The operation of the system 10, in accordance with one embodiment of the present invention shown in FIG. 2, begins when the client 12 requests a web page from an Internet web site. The web server 20 associated with the web page serves the web page to the client 10, for example using the Hypertext Transfer Protocol (HTTP). In the course of using or viewing the web page, the user may encounter a problem with the web page. As a result, the user may request help, for example by operating a help icon.

The help icon may be a conventional graphical user interface associated with a browser or with a particular web page. In response to the selection of the help icon, a client agent, resident on the client 12, intercepts the Internet web page information, such as its Uniform Resource Locator. The client agent may then forward information about the client 12, the web page and the Uniform Resource Locator to a help server 22. The help server 22 receives the help request and determines whether the request is an appropriate request for the help server 22 to handle. For example, the help server 22 may be associated with a particular web server 20 and may not take general requests for assistance in one embodiment.

The client agent then automatically initiates a chat session via an Internet Reply Chat (IRC) channel. The chat session sets up a text communication via electronic mail between the client 12 and the help server 22. The client agent also initiates an automatic refresh that recalls the subject web page and assists the client agent in forwarding the appropriate information to the help server 22.

As a result, the help server 22 can display the exact same web page that the user is viewing. A person monitoring the help server 22 may then use that information and the associated chat session to receive user queries and to provide text responses to the user. Alternatively, the help service and the user may communicate over a telephone link.

Figure 3:
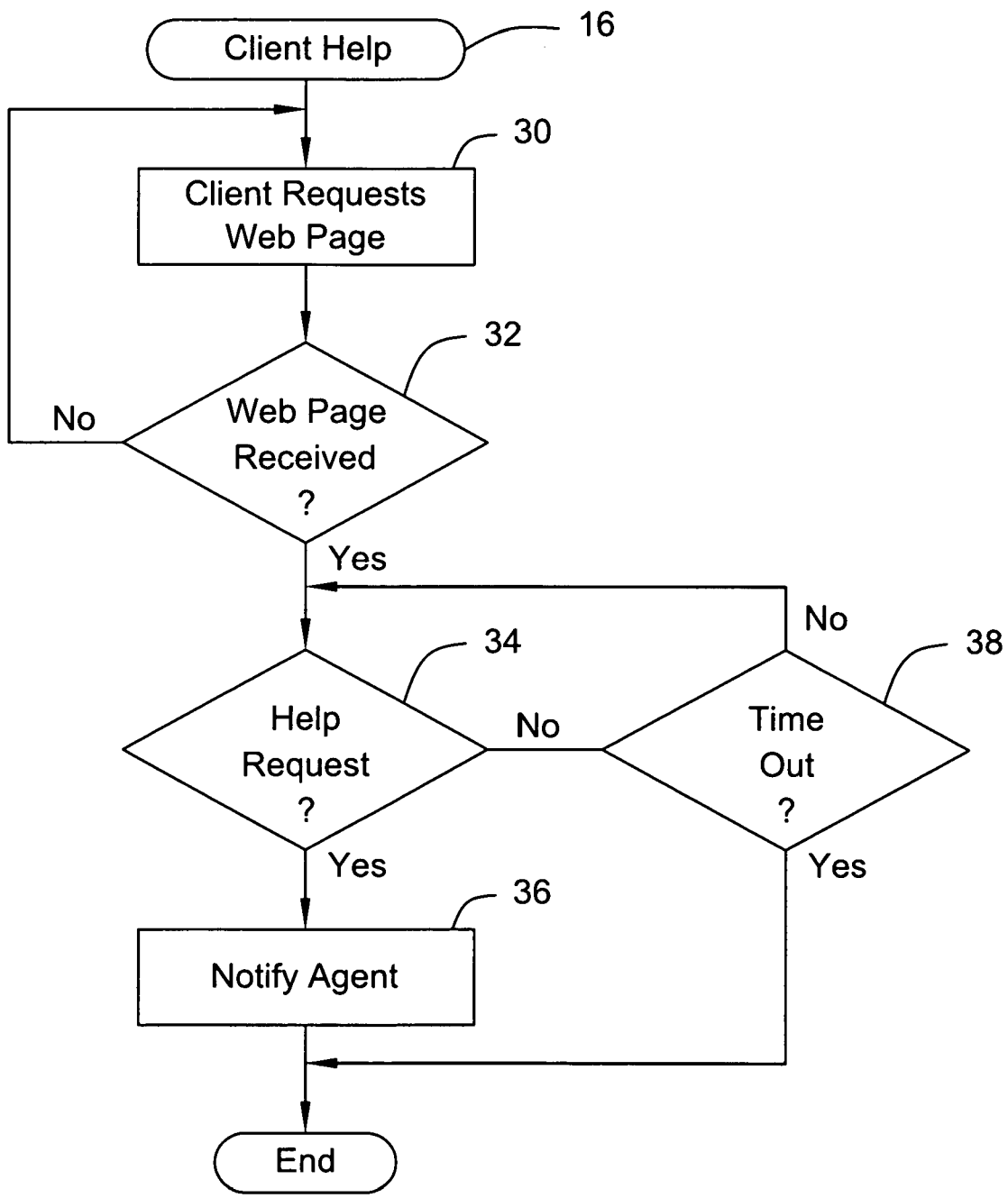
FIG. 3 is a flow chart for software on a client in accordance with one embodiment of the present invention.

Turning next to FIG. 3, the client help software 16, resident on the storage 14 associated with the client 12, initially receives a client request for web page as indicated in block 30 in one embodiment of the invention. When the web page is received, as determined at diamond 32, a check at diamond 34 determines whether there is a help request. As mentioned previously, the help request may occur through the selection of an appropriate icon. The icon may be selected using a mouse cursor system.

The icon may be generated by the web server 20 and may include a link to the help server 22. Alternatively, the icon may otherwise provide information, such as a Uniform Resource Locator, to enable a link to the help server 22 in one embodiment. The location of the help server 22 may be provided to a client agent that administers the help function.

When a help request is identified, the client automatically notifies the client agent as indicated in block 36. If a help request is not forthcoming in a reasonably timely fashion, as determined in diamond 38, the flow may end.

Figure 4:
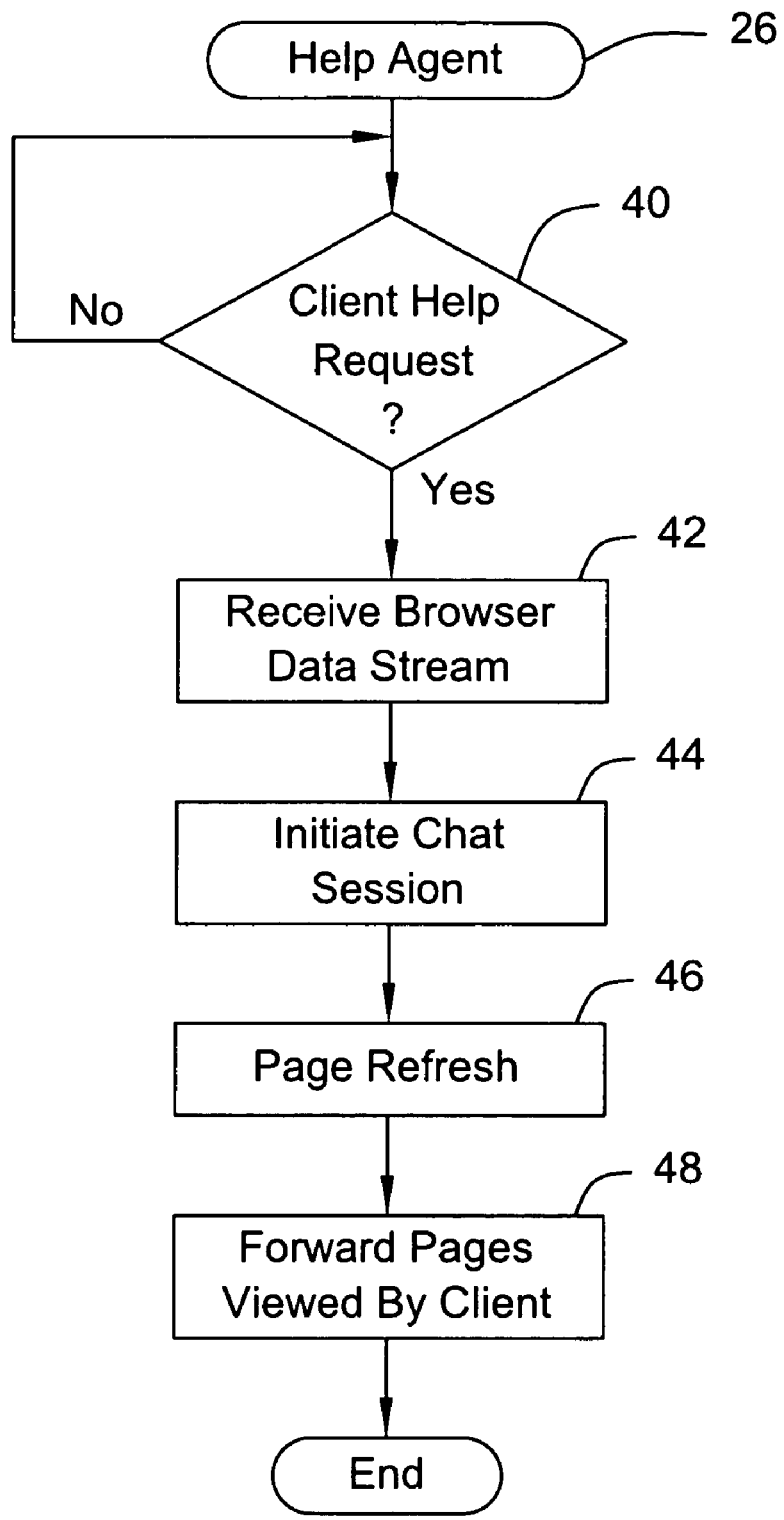
FIG. 4 is a flow chart for software on the client in accordance with one embodiment of the present invention.

Referring to FIG. 4, the help agent software 26 begins by identifying a client help request as indicated in diamond 40. In some embodiments of the present invention, the request is initiated when the user selects an appropriate help icon on the web page. The agent then receives a browser data stream as indicated in block 42. The browser data stream may include information about data that the user has entered into the web page and the location of the web page such as its Uniform Resource Locator.

The help agent automatically initiates a chat session as indicated in block 44. In addition, the client agent automatically requests a refresh of the web page, as indicated in block 46, to facilitate the transmission of the Uniform Resource Locator for that page to the help server 22. The appropriate information, including the identification of the particular web page viewed by the client 12, is then forwarded to the help server 22 as indicated in block 48.

Figure 5:
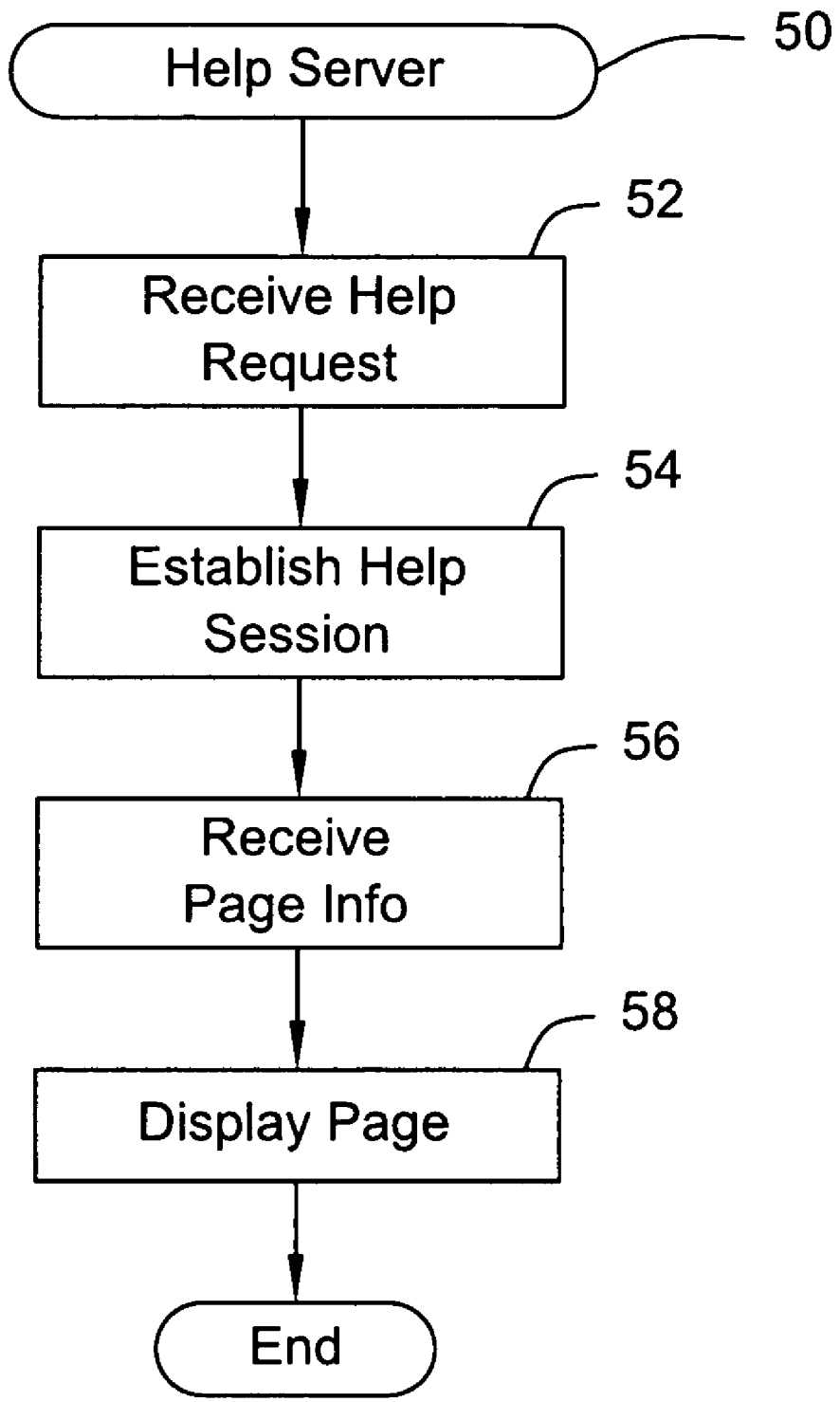
FIG. 5 is a flow chart for software on a help server in accordance with one embodiment of the present invention.

At the help server 22, the software 50 receives a help request as indicated in block 52 in FIG. 5. The help server 22 authenticates the help request and, if appropriate, establishes a help session as indicated in block 54. The web page information is then received from the client agent as indicated in block 56. This information is utilized to display, at the help server 22, the appropriate web page as indicated in block 58. A service provider using the help server 22 may then communicate with the user using the established chat session to walk the user through a solution to the user's problems.

Figure 6:
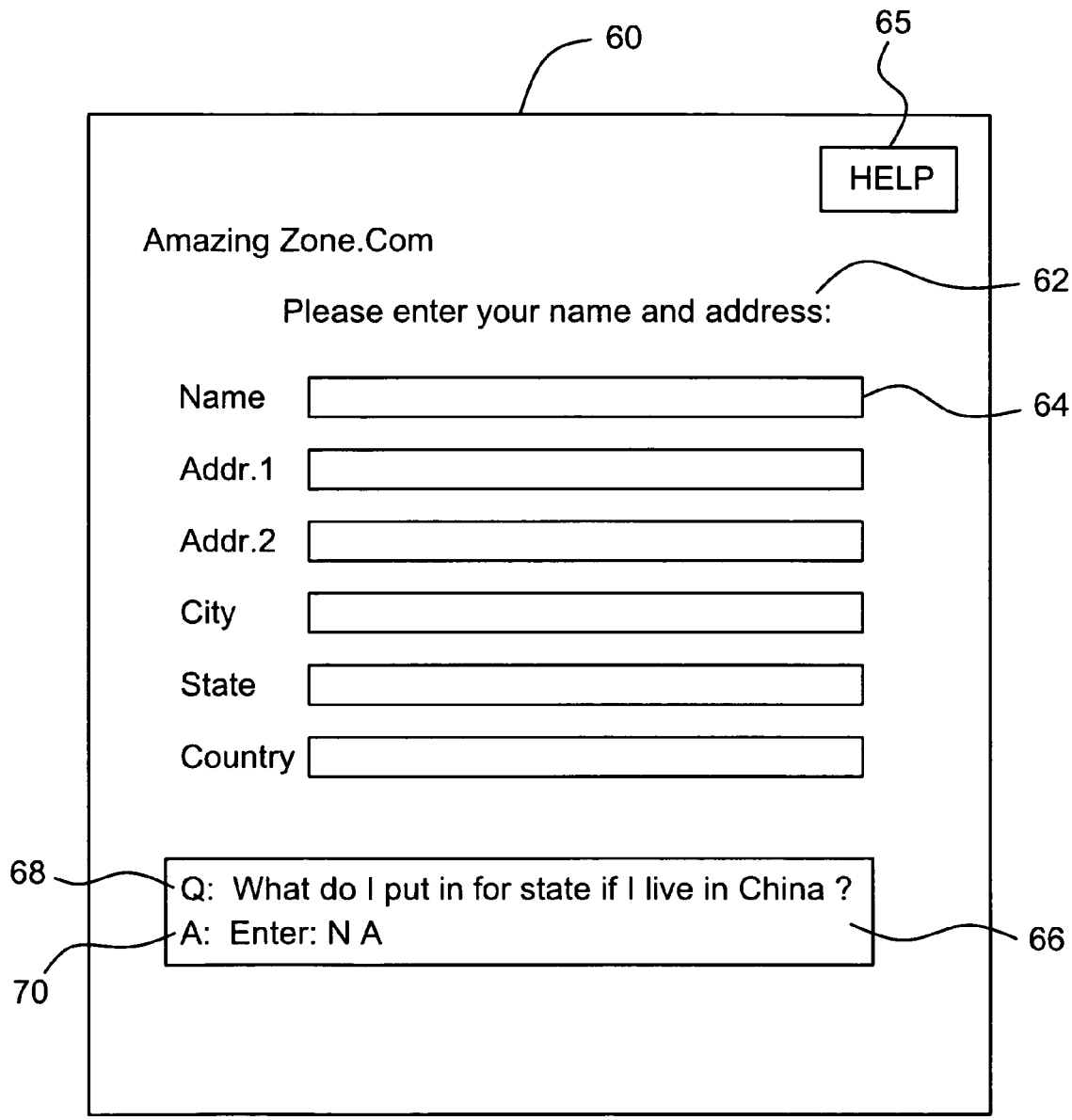
FIG. 6 is a screen display in accordance with one embodiment of the present invention.

Thus, in one example, shown in FIG. 6, a web page 60 may be associated with an electronic commerce provider who may be providing products or services over the Internet. To facilitate communications with the electronic commerce provider, the provider may request information about the user as indicated at 62. A number of dialog boxes 64 may be provided for the user to enter appropriate information. After the user has indicated that the user needs help by operating an icon 65, a chat session is automatically initiated. The chat session may be initiated through a dialog box 66 that overlays the web page 60. Thus, the user may enter a question (indicated at 68) and the web server 22 may provide an answer (as indicated at 70).

A method may comprise receiving a client request for help relating to a web page. Information to remotely access the web page is automatically provided.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a client request for help related to a web page;
   automatically receiving a web page locator providing information to remotely access said web page;
   using said information to automatically remotely access said web page;
   automatically initiating a chat session with a remote help service provider in response to the client request for help; and
   overlapping a chat dialog box over said web page.

2. The method of claim 1 including automatically initiating a web page refresh in response to the client request for help.

3. The method of claim 1 wherein receiving the client request for help includes providing a client agent which obtains a Uniform Resource Locator identifying the web page and forwards the Uniform Resource Locator to a remote processor-based system.

4. The method of claim 3 further including collecting information about a client and forwarding said information to the remote system.

5. The method of claim 1 wherein receiving the client request for help includes receiving a client selection of a help icon.

6. The method of claim 5 including extracting information about a remote processor-based system from said web page.

7. An article comprising a medium storing instructions that enable a processor-based system to:
   receive a client request for help related to a web page; and
   automatically provide information, including a web page locator, to remotely access said web page;
   automatically initiate a chat session with a remote help service provider in response to the client request for help; and
   overlap a chat dialog box over said web page.

8. The article of claim 7 further storing instructions that enable the processor-based system to automatically initiate a web page refresh in response to the client request for help.

9. The article of claim 7 further storing instructions that enable the processor-based system to provide a client agent which obtains a Uniform Resource Locator identifying the web page and forwards the Uniform Resource Locator to a remote location.

10. The article of claim 9 further storing instructions that enable the processor-based system to collect information about a client and forward said information to a remote location.

11. The article of claim 7 further storing instructions that enable the processor-based system to receive a client selection of a help icon.

12. The article of claim 11 further storing instructions that enable the processor-based system to extract information about a remote processor-based system from said web page.

13. A system comprising:
   a processor; and
   a storage coupled to said processor, said storage storing instructions that enable the processor to receive a client request for help related to a web page and automatically provide web page locator information to remotely access said web page, automatically initiating a chat session with a remote help service provider in response to the client request for help, and overlapping a chat dialog box over said web page.

14. The system of claim 13 wherein said storage stores instructions that enable the system to automatically initiate the chat session with a help service provider response to the client request for help.

15. The system of claim 13 wherein said storage stores instructions that enable the system to automatically obtain contact information identifying the web page and forward said information to a remote processor-based system.

* * * * *